United States Patent
Chang et al.

(10) Patent No.: US 8,848,105 B2
(45) Date of Patent: *Sep. 30, 2014

(54) VIDEO PLAYING DEVICE CAPABLE OF EXTERNAL CONNECTION TO APPLICATION PROCESSOR

(71) Applicants: Sheng-Chuag Chang, Taipei (TW); Pao-Tse Wu, Taipei (TW)

(72) Inventors: Sheng-Chuag Chang, Taipei (TW); Pao-Tse Wu, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,392

(22) Filed: Dec. 13, 2013

(65) Prior Publication Data

US 2014/0109161 A1 Apr. 17, 2014

Related U.S. Application Data

(63) Continuation-in-part of application No. 13/569,575, filed on Aug. 8, 2012, now Pat. No. 8,711,284.

(30) Foreign Application Priority Data

Oct. 26, 2011 (TW) ............... 100138761 A

(51) Int. Cl.
| | |
|---|---|
| *H04N 7/00* | (2011.01) |
| *H04N 11/00* | (2006.01) |
| *H04N 5/66* | (2006.01) |
| *H04N 9/12* | (2006.01) |
| *H04M 3/00* | (2006.01) |
| *H04N 7/10* | (2006.01) |
| *H04N 7/025* | (2006.01) |
| *H04N 7/173* | (2011.01) |
| *H04N 21/422* | (2011.01) |
| *H04M 1/725* | (2006.01) |
| *H04N 21/443* | (2011.01) |
| *H04N 21/41* | (2011.01) |
| *H04N 5/44* | (2011.01) |
| *H04N 21/462* | (2011.01) |

(52) U.S. Cl.
CPC ....... *H04N 5/4403* (2013.01); *H04N 21/42212* (2013.01); *H04M 1/72527* (2013.01); *H04N 21/443* (2013.01); *H04N 21/4122* (2013.01); *H04N 21/4126* (2013.01); *H04N 21/42225* (2013.01); *H04N 21/4622* (2013.01)
USPC ............. 348/552; 348/739; 455/420; 725/34; 725/115; 725/110

(58) Field of Classification Search
None
See application file for complete search history.

(56) References Cited

U.S. PATENT DOCUMENTS

| | | | |
|---|---|---|---|
| 2003/0046689 A1* | 3/2003 | Gaos | 725/34 |
| 2011/0157480 A1* | 6/2011 | Curl | 348/739 |
| 2011/0247044 A1* | 10/2011 | Jacoby | 725/115 |
| 2013/0109371 A1* | 5/2013 | Brogan et al. | 455/420 |

* cited by examiner

*Primary Examiner* — Jefferey Harold
*Assistant Examiner* — Sean Haiem
(74) *Attorney, Agent, or Firm* — Ming Chow; Sinorica, LLC

(57) ABSTRACT

A video playing device capable of external connection to an application processor includes a remote controller and a processor. The remote controller includes a first button group having a plurality of buttons for use in operating the video playing device and a second button group having a plurality of buttons for use in operating a portable carrier. The processor processes an external video signals and portable carrier video signals from the portable carrier, sends the signals to a screen, and processes remote control signals corresponding to the first and second button groups. The processor sends to the portable carrier a plurality of signals according to the remote control signals of the second button group. A portion of the signals triggers the application processor of the portable carrier to execute a plurality of App accordingly.

15 Claims, 10 Drawing Sheets ant Ser. No. 13/569,575 filed on Aug. 8, 2012 which
VIDEO PLAYING DEVICE CAPABLE OF EXTERNAL CONNECTION TO APPLICATION PROCESSOR This application is a continuation-in-part of U.S. patent application Ser. No. 13/569,575 filed on Aug. 8, 2012 which claimed a foreign priority to TW 100138761, filed on Oct. 26, 2011.

FIELD OF THE INVENTION

The present invention relates to video playing devices, and more particularly, to a video playing device conducive to integration of a hardware silicon intellectual property (IP) chip of an application processor of a portable carrier and its direct use in a remote controller of the video playing device so as to operate the portable carrier.

BACKGROUND OF THE INVENTION

Conventional smart TV is designed to operate in a standalone manner, so that hardware circuits and software inside the conventional smart TV not only carry out the functions of a conventional video playing device independently but also carry out a function equivalent to execution of programs on a computer independently. Conventional smart TV seemingly integrates a conventional video playing device and a conventional computer into an electronic machine.

In addition to the functions of conventional mobile phones, conventional smartphones have the functions of handheld computers. Some conventional portable carriers are equipped with connectors for connecting to some external devices, such as a USB flash drive, a keyboard, and a screen etc.

Both a conventional TV set and a conventional smartphone lack the design of integration of a hardware silicon intellectual property (IP) chip; as a result, it is impossible to integrate the functions of the conventional TV set and the conventional smartphone. In view of this, the inventor of the present invention anticipates improvement of the prior art and thus invents a video playing device capable of external connection to an application processor.

SUMMARY OF THE INVENTION

It is an objective of the present invention to provide a video playing device conducive to integration of a hardware silicon intellectual property (IP) chip of an application processor of a portable carrier and its direct use in a remote controller of the video playing device so as to operate the portable carrier.

In order to achieve the above and other objectives, the present invention provides a video playing device capable of external connection to an application processor, comprising: a remote controller comprising the a button group having a plurality of buttons and a second button group having a plurality of buttons, wherein the first button group is for use in operating the video playing device, and the second button group is for use in operating a portable carrier; and a processor for processing incoming external video signals and portable carrier video signals from the portable carrier, sending the processed signals to a screen for displaying a frame related to the external video signals and a frame related to the portable carrier video signals, and processing a plurality of remote control signals related to the first and second button groups, wherein the processor sends a plurality of signals to the portable carrier according to the remote control signals related to the second button group, wherein a portion of the signals triggers the application processor of the portable carrier to execute a plurality of related App, wherein the processor and the portable carrier send to and receive from each other data or instructions associated with the App.

BRIEF DESCRIPTION OF THE DRAWINGS

To enable persons skilled in the art to fully understand the technical features and advantages of the present invention, the present invention is hereunder illustrated with preferred embodiments in conjunction with the accompanying drawings, in which.

DETAILED DESCRIPTION OF THE EMBODIMENTS

Figure 1:
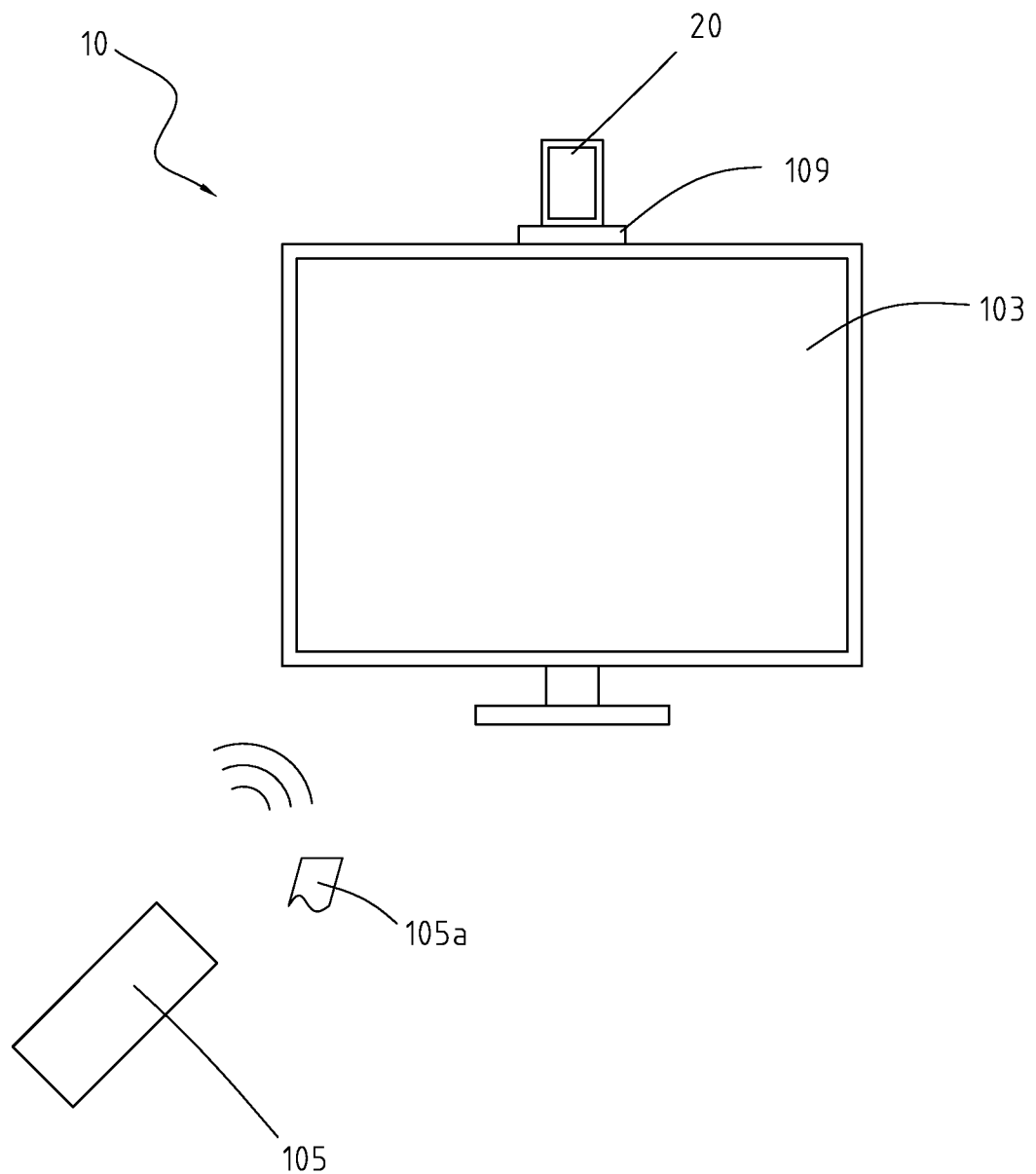
FIG. 1 is a schematic view of a video playing device capable of external connection to an application processor according to the first embodiment of the present invention, showing that the video playing device is wired connected to a portable carrier.

Referring to FIGS. 1, 2, 3, 4, according to the present invention, video playing devices 10, 10' are wired or wireless connected to a portable carrier 20, such that processors 101, 101' of the video playing devices 10, 10' and an application processor 201 of the portable carrier 20 can send signals to each other. Hence, the present invention is chiefly characterized in that the video playing devices 10, 10' are capable of external connection to an application processor, wherein a hardware silicon intellectual property (IP) chip of the processors 101, 101' is integrated with another hardware silicon intellectual property (IP) chip, that is, the application processor 201 of the portable carrier 20. From a user's perspective, the user exercises remote controller over the video playing devices 10, 10' or the portable carrier 20 by means of remote controllers 105, 105'.

The video playing devices 10, 10' are provided in the form of a TV set, a set-top box, a flat display unit, or a game console, for example. The TV set is, for example, a conventional TV set, Internet TV, or even smart TV. The set-top box is, for example, a TV set-top box. The game console is, for example, a PS3™ game console produced by SONY™. The flat display unit is exemplified by a liquid crystal display or an organic electroluminesence display (OLED). The TV set, the TV set-top box, and the game console operate in conjunction with remote controllers, and thus the TV set, the TV set-top box, and the game console are each built-in with a receiving circuit of remote control signals. In particular, according to the present invention, the flat display unit has to be equipped with a remote controller and a receiving circuit of remote control signals.

Figure 2:
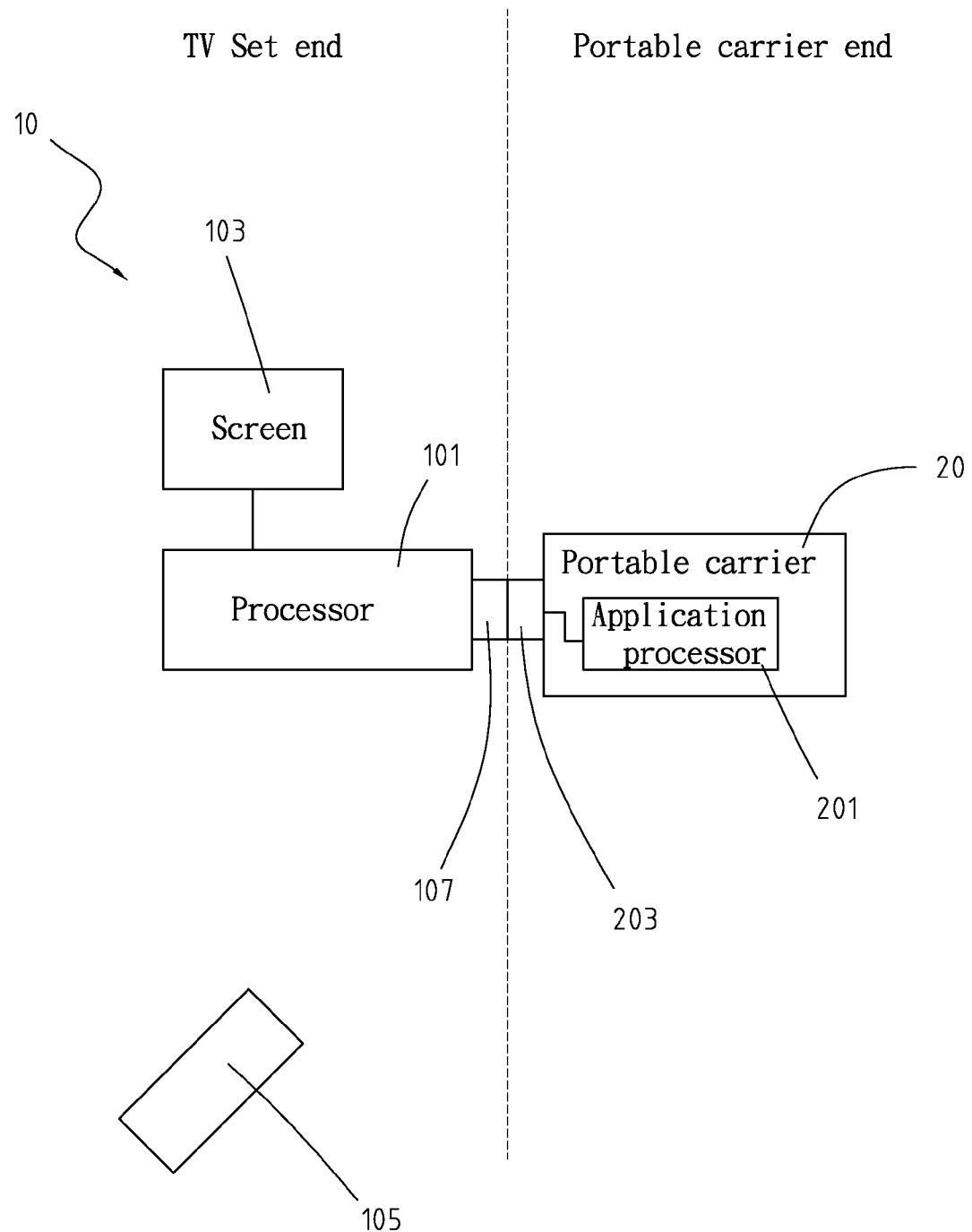
FIG. 2 is a block diagram of the video playing device capable of external connection to an application processor and wired connected to the portable carrier according to the first embodiment of the present invention.
Figure 3:
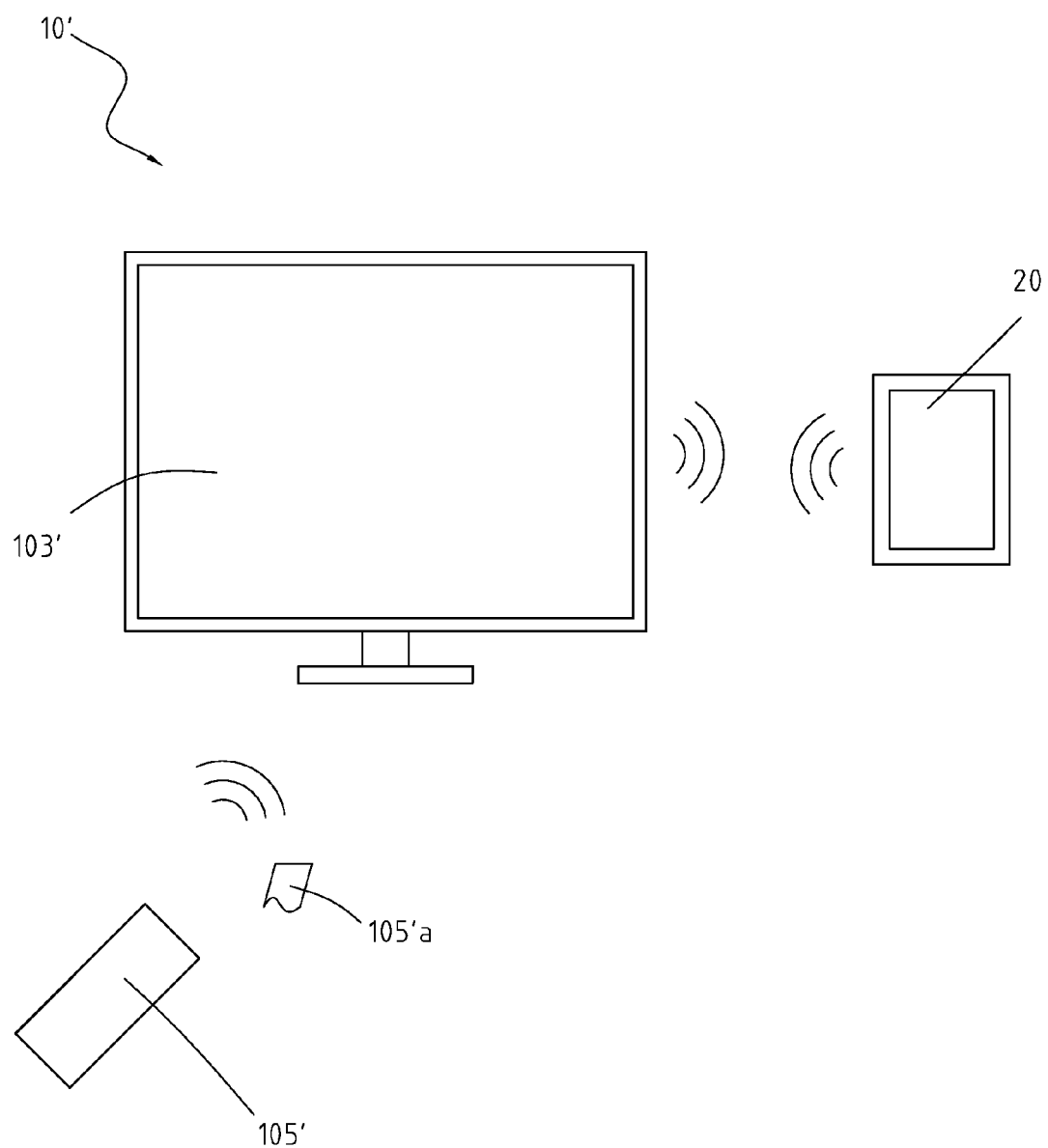
FIG. 3 is a schematic view of the video playing device capable of external connection to an application processor and wireless connected to the portable carrier according to the second embodiment of the present invention.
Figure 4:
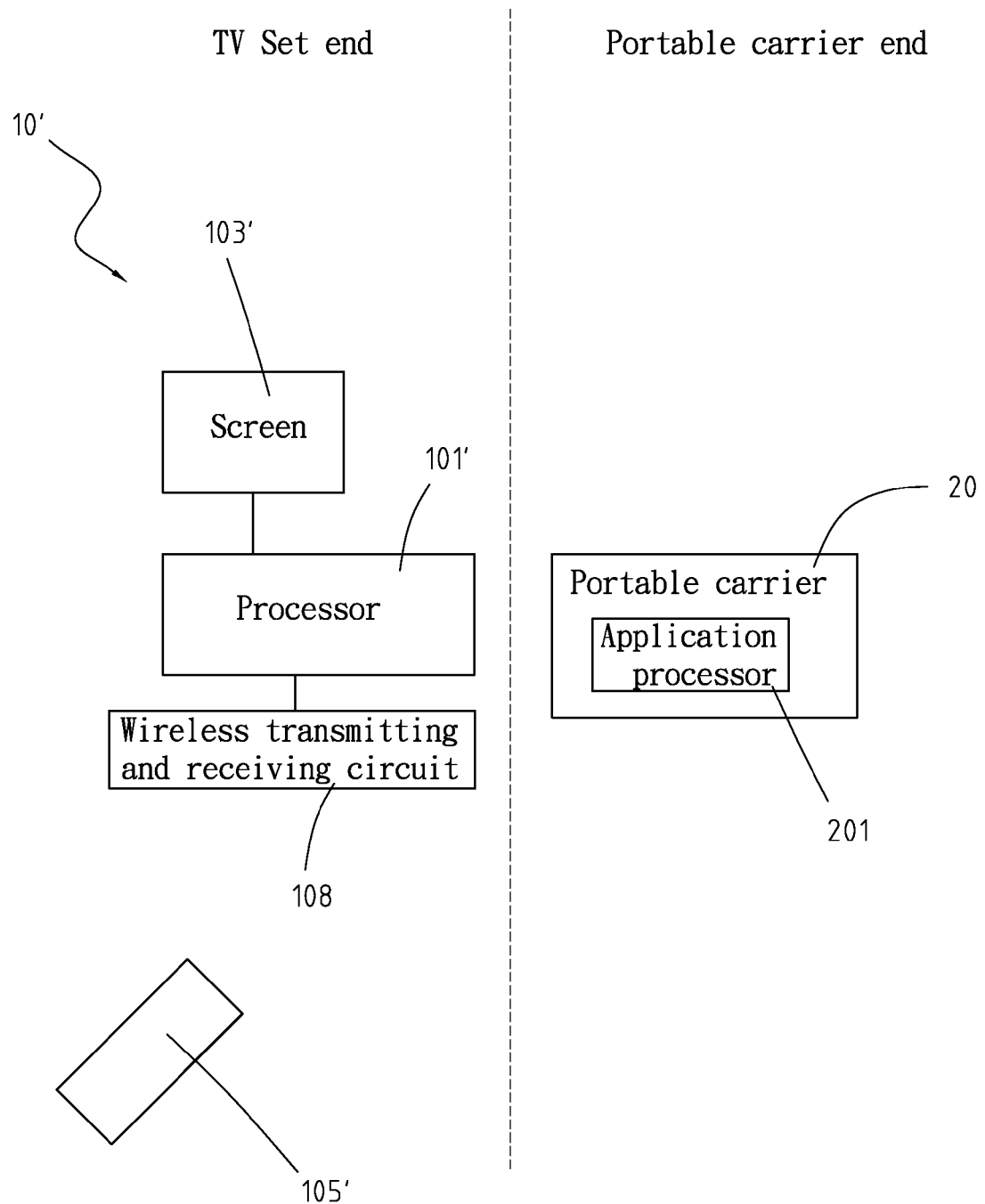
FIG. 4 is a block diagram of the video playing device capable of external connection to an application processor and wireless connected to the portable carrier according to the second embodiment of the present invention.

To render it easy to understand the present invention, the video playing devices 10, 10' of FIGS. 1~4 are each exemplified by a TV set. Referring to FIGS. 1, 2, there are shown schematic views of the video playing device 10 wired connected to the portable carrier 20 according to the first embodiment of the present invention. The video playing device 10 comprises the processor 101, the remote controller 105, the first connector 107, and a docking base 109. Referring to FIGS. 3, 4, there are shown schematic views of the video playing device 10 wireless connected to the portable carrier 20 according to the second embodiment of the present invention. The video playing device 10' comprises the processor 101', the remote controller 105', and a wireless transmitting and receiving circuit 108.

Referring to FIGS. 1~4, hardware components attributed to the video playing devices 10, 10' and the portable carrier 20 and related directly to the present invention are shown, whereas hardware components attributed to the video playing devices 10, 10' and the portable carrier 20 but irrelevant to the present invention are not shown.

The processors 101, 101' are adapted to processing incoming external TV video signals, such as TV program video signals from a cable television station or TV program video signals from a wireless television station, and portable carrier video signals from the portable carrier 20, and send the processed signals to a screen 103, 103' which display a frame related to the external video signals and a frame related to the portable carrier video signals. Another purpose of the processors 101, 101' is to process a plurality of remote control signals 105a, 105'a emitted from the remote controllers 105, 105', respectively. The processors 101, 101' may be conventional components, for example conventional integration system single-chip liquid crystal display TV (LCD TV) processors.

Figure 5:
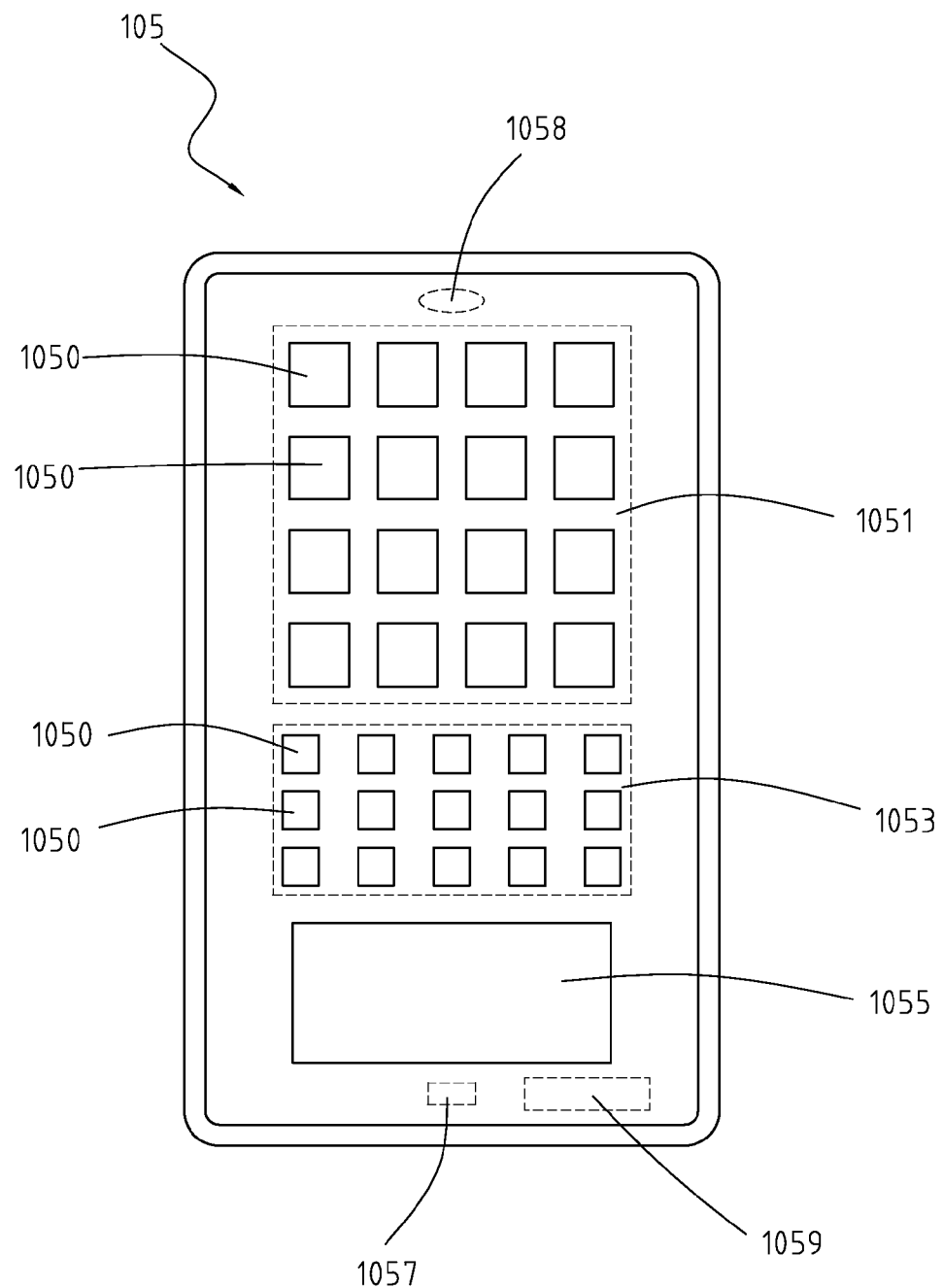
FIG. 5 is a schematic view of the appearance of a remote controller of the video playing device capable of external connection to an application processor according to the present invention.

Referring to FIG. 5, in the first embodiment, as soon as the processor 101 of video playing device receives from the remote controller 105 the remote control signals 105a attributed to a button 1050 of the first button group 1051, such as the remote control signals 105a for tuning volume, and the remote control signals 105a for selecting channels, the processor 101 sends related signals to a related hardware component (not shown) inside the video playing device 10, such that the related signals are processed by the related hardware component to respond to the remote control signals 105a of the first button group 1051.

As soon as the processor 101 receives from the remote controller 105 the remote control signals 105a attributed to a button 1050 of the second button group 1053, such as the remote control signals 105a for executing store App, the remote control signals 105a for executing Facebook®, the remote control signals 105a for executing YouTube®, the remote control signals 105a for executing a browser, the remote control signals 105a for executing mobile phone dialing App, the remote control signals 105a for executing Apple® itunes® alike, the remote control signals 105a for executing games, the remote control signals 105a for executing shopping cart App, the remote control signals 105a for executing Internet Protocol Television (IPTV) App, the remote control signals 105a for executing digital video recording (DVR) App, and the remote control signals 105a for executing electronic program guide (EPG) App, the processor 101 then sends to the application processor 201 via the first connector 107 related signals for executing App, such that the application processor 201 of the portable carrier 20 executes related App to respond to the remote control signals 105a of the second button group 1053.

The docking base 109 is intended to place the portable carrier 20 and equipped with the first connector 107. As soon as the portable carrier 20 is put on the docking base 109, electrical contacts (not shown) of the first connector 107 come into contact with electrical contacts (not shown) of the second connector 203 of the portable carrier 20, thereby electrically connecting the video playing device 10 and the application processor 201 together to allow the processor 101 and the application processor 201 to send signals to and receive signals from each other. The docking base 109 is formed integrally with the casing of the video playing device 10. Alternatively, the docking base 109 is separable from the casing of the video playing device 10, and the processor 101 is connected to the first connector 107 of the docking base 109 by an electrical cable (not shown).

From the perspective of appearance, the first connector 107 has a foolproof mechanism, and preferably together with an easy-to-plug-and-unplug mechanism. The second connector 203 is manufactured to fit the deign of the first connector 107. The first connector 107 and the second connector 203 may be provided directly in the form of a conventional male connector and a conventional female connector. Signals transmitted to the first connector 107 and the second connector 203 include conventional I2C signals or conventional high-speed serial. Signals transmitted between the first connector 107 and the second connector 203 include those signals which function as carriers of instructions, data, or statuses, for example.

The remote controller 105 essentially comprises the first button group 1051 and the second button group 1053. Furthermore, the remote controller 105 further comprises a cursor coordinate input device 1055, a microphone 1057, a speaker 1058, and a wireless voice transceiving circuit 1059. Each component of the remote controller 105 is described below.

Figure 6:
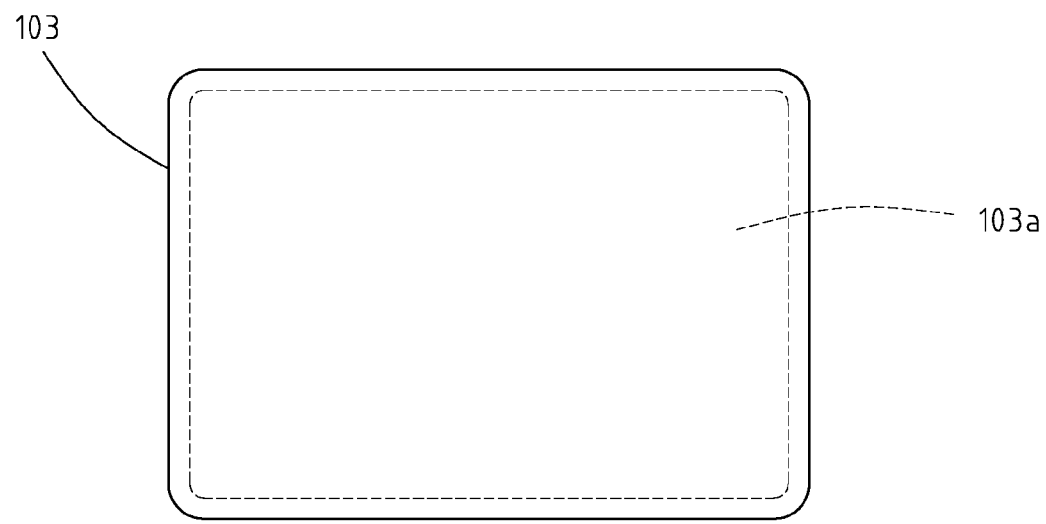
FIG. 6 is a schematic view of a frame of the screen of the video playing device capable of external connection to an application processor according to the present invention, wherein the frame is based on TV video signals.
Figure 7:
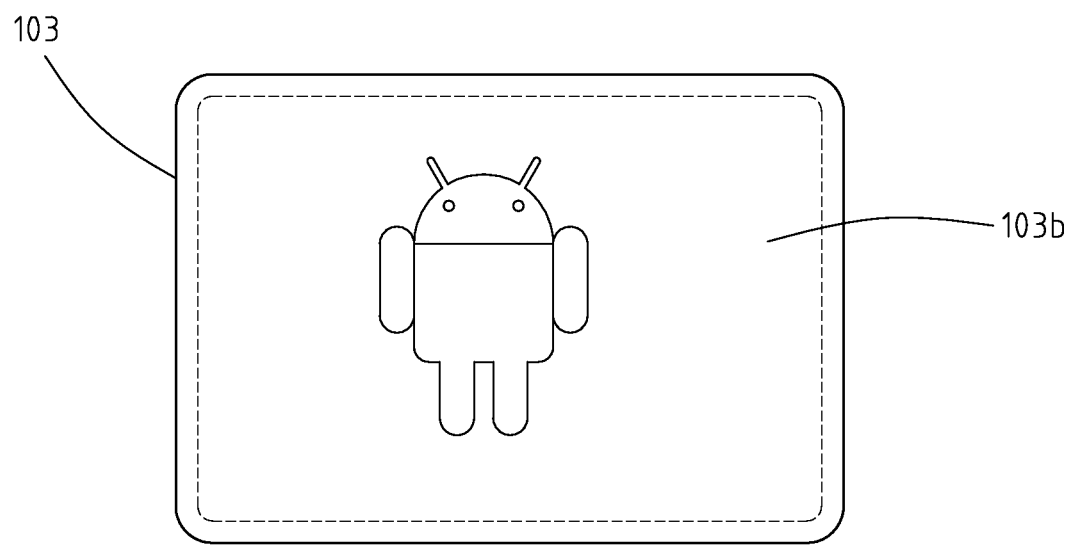
FIG. 7 is a schematic view of a frame of the screen of the video playing device capable of external connection to an application processor according to the present invention, wherein the frame is based on portable carrier output.
Figure 8:
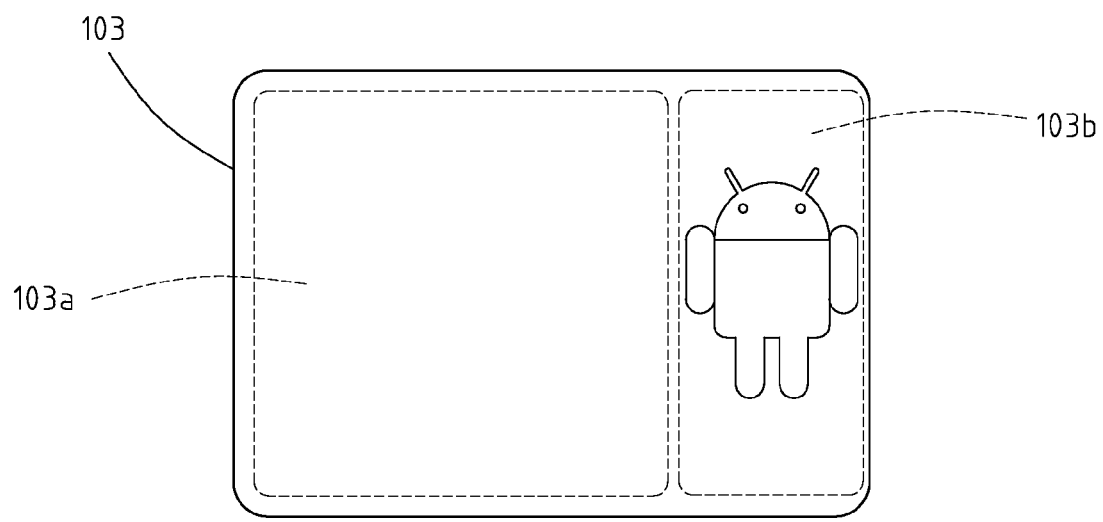
FIG. 8 is a schematic view of a TV video signal-related frame and a portable carrier output-related frame of the screen of the video playing device capable of external connection to an application processor according to the present invention.

The first button group 1051 consists of a plurality of buttons 1050. As soon as the user presses one of the buttons 1050 of the first button group 1051, the remote controller 105 sends the remote control signals 105a related to the button 1050 pressed. The buttons 1050 attributed to the first button group 1051 are for use in operating the video playing device 10, and results of operation of the video playing device 10 are displayed in a frame 103a shown in FIG. 6. Take a TV set as an example, the frame 103a displayed on the screen 103 is the frame related to the TV video signals. The second button group 1053 consists of a plurality of buttons 1050. As soon as the user presses one of the buttons 1050 of the second button group 1053, the remote controller 105 sends the remote control signals 105a related to the button 1050 pressed. The buttons 1050 attributed to the second button group 1053 are for use in operating the portable carrier 20, and the frame of execution of the remote control signals 105a by the portable carrier 20 are displayed in a frame 103b displayed on the screen 103 of FIG. 7. The frame 103b is a frame output as a result of execution of related App by the portable carrier 20. Furthermore, the frame 103a and the frame 103b are concurrently displayed on the screen 103, as shown in FIG. 8.

The buttons 1050 of the first and second button groups 1051, 1053 may be provided in the form of physical button switches or screen virtual buttons.

In the first embodiment, the frame of the portable carrier 20 is output to the video playing device 10 and displayed on the screen 103. The video output and even the audio output of the portable carrier 20 each may be provided in the form of a wired conventional HDMI output means or a conventional MHL™ (Mobile High-Definition Link-MHL) transmitting means.

The cursor coordinate input device 1055 may be disposed at the remote controller 105 and positioned proximate to the bottom thereof. The chief purpose of the cursor coordinate input device 1055 is to provide cursor coordinate signals to the portable carrier 20. The cursor coordinate input device 1055 is, for example, a conventional touch panel for use with a notebook computer. The cursor coordinate signals generated from the cursor coordinate input device 1055 are received and processed by the processor 101, and then the processor 101 sends signals corresponding to the cursor coordinate signals to the application processor 201 via the first connector 107 and the second connector 203 in the first embodiment of the present invention.

The microphone 1057, the speaker 1058, and the wireless voice transceiving circuit 1059 are for use with some App of the portable carrier 20, such as phone dialing App, phone call receiving App, and web-based video chat App. Voice conversion takes place between a user using the microphone 1057 and the speaker 1058 and the receiver, the caller, or a web-based video chat participants at the other end of the portable carrier 20. The microphone 1057 and the speaker 1058 are connected to the wireless voice transceiving circuit 1059. The microphone 1057, the speaker 1058, and the wireless voice transceiving circuit 1059 may be provided directly in the form of conventional components and conventional circuit crafts.

The user can selectively use a microphone and a speaker built-in the portable carrier 20 rather than the microphone 1057, the speaker 1058, and the wireless voice transceiving circuit 1059. At this point in time, the user uses a handsfree headset of the portable carrier 20 in conducting voice conversion with the receiver, the caller, or a web-based video chat participants at the other end of the portable carrier 20.

Furthermore, the application processor 201 of the portable carrier 20 sends data signals or instructions signals to the processor 101 via the second connector 203 and the first connector 107. For example, as soon as the portable carrier 20 receives a text message or an incoming phone call, the application processor 201 will send instructions signals (such as "check new text message" instructions and "answer phone call" instructions) to the processor 101, and then the processor 101 displays the contents of instructions signal-related instructions (such as "check new text message" and "answer phone call") on the screen 103 by a conventional screen display (OSD-On Screen Display) means. Afterward, the user presses a button 1050 of the second button group 1053 to instruct the portable carrier 20 to execute check new text message App or answer phone call App. The App executed by the portable carrier 20 transmits data signals or instructions signals to the processor 101 via the second connector 203 and the first connector 107. For instance, shopping cart App requests the processor 101 to report the TV channel number of the TV channel being watched, and then shopping cart App confirms whether the user is watching a shopping program according to the reported TV channel number. For instance, digital video recording (DVR) App requests the processor 101 to continuously send frame data of the TV program being watched, so as for the TV program to be video recorded on the portable carrier 20 or cloud storage. For instance, electronic program guide (EPG) App requests the processor 101 to switch to a specified TV channel, and then the processor 101 receives an instruction of switching to the specified TV channel and performs a switch of TV channel right away.

3D frame display is illustrated below by an example, in which the video playing device 10 is capable of processing and displaying 3D frames, and 3D frame data for use in a marketing briefing are stored in the portable carrier 20. To begin briefing, the user inserts the portable carrier 20 into the docking base 109 and executes briefing App with the portable carrier 20 operable by the remote controller 105. The briefing App then sends 3D frame data of the marketing briefing, frame by frame, to the processor 101 via the second connector 203 and the first connector 107. Next, the processor 101 processes the 3D frame data received and displays the 3D frames on the screen 103 frame by frame. In the above example of 3D frame display, although the portable carrier 20 is incapable of processing and displaying 3D frames, the portable carrier 20 can gain access to hardware resources of the video playing device 10 because of a design of the present invention, that is, the video playing device 10 is capable of integrating hardware silicon intellectual property (IP) chips.

In the second embodiment of the present invention, the wireless transmitting and receiving circuit 108 is provided in the form of a conventional Wi-Fi circuit. The video playing device 10' is Wi-Fi connected to the portable carrier 20. As soon as the processor 101' receives from the remote controller 105' the remote control signals related to one of the buttons of the second button group, the processor 101' sends, in a Wi-Fi wireless manner, signals for use in App execution to the application processor 201, such that the application processor 201 of the portable carrier 20 executes related App.

The difference between the second embodiment and the first embodiment is as follows: a wireless transmitting/receiving means in the second embodiment substitutes for a wired transmitting/receiving means in the first embodiment.

In the second embodiment, if the portable carrier 20 and the video playing device 10 are each built-in with a wireless HDMI transmitting/receiving means, such as WiHD, WiDi (Wireless Display), the video output or even audio output of the portable carrier 20 can wireless transmit video and audio by a conventional wireless HDMI transmitting means, and then the video playing device 10 receives the video and audio by a conventional wireless HDMI receiving means. If the portable carrier 20 and the video playing device 10' are each built-in with a Wi-Fi Display transmitting/receiving means, such as Miracast™, Airplay™, the video output or even audio output of the portable carrier 20 can wireless transmit video and audio by a conventional Wi-Fi Display transmitting means, and then the video playing device 10' receives the video and audio by a conventional Wi-Fi Display receiving means.

Figure 9:
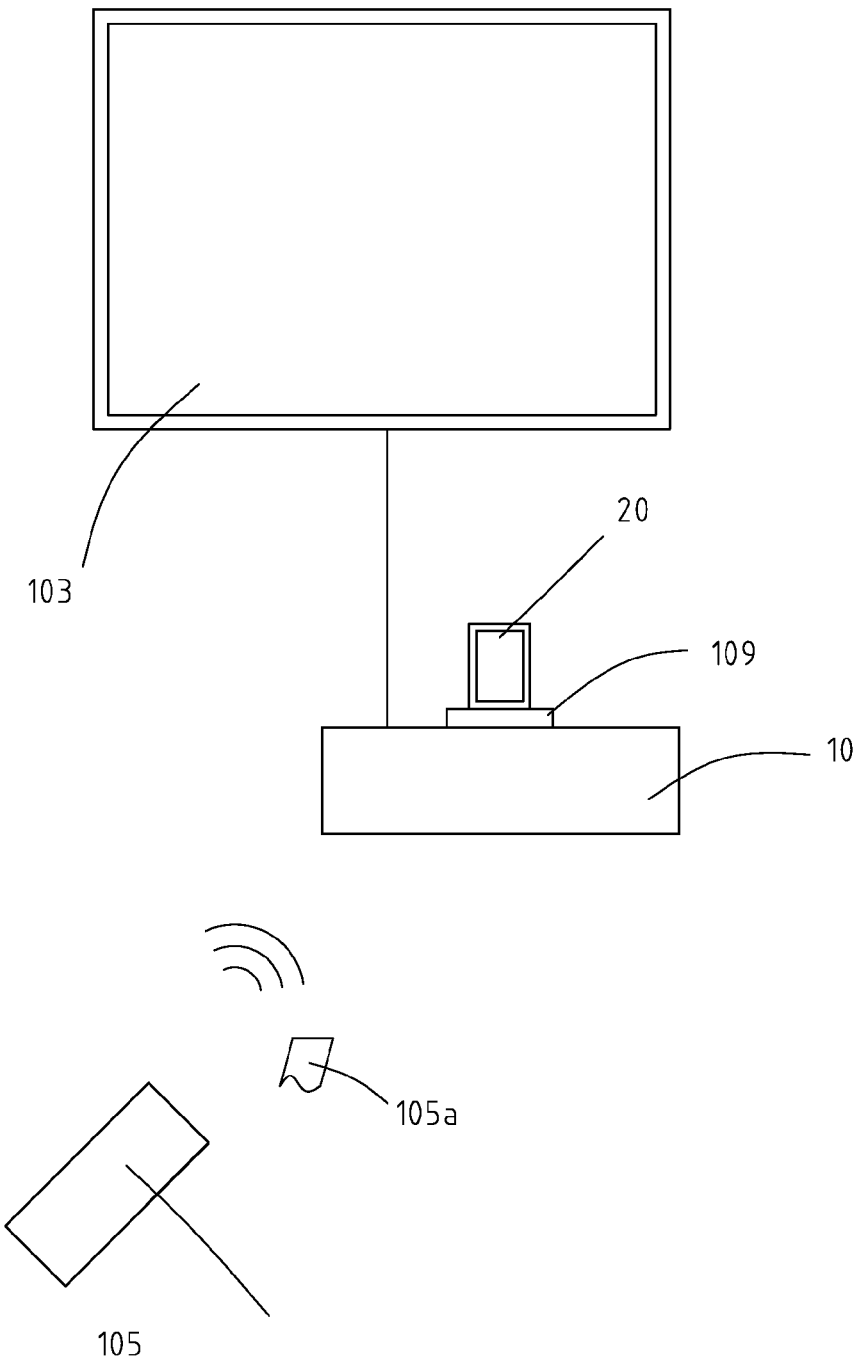
FIG. 9 is a schematic view of a set-top box video playing device capable of external connection to an application processor according to the first embodiment of the present invention, showing that the set-top box video playing device is wired connected to a portable carrier.
Figure 10:
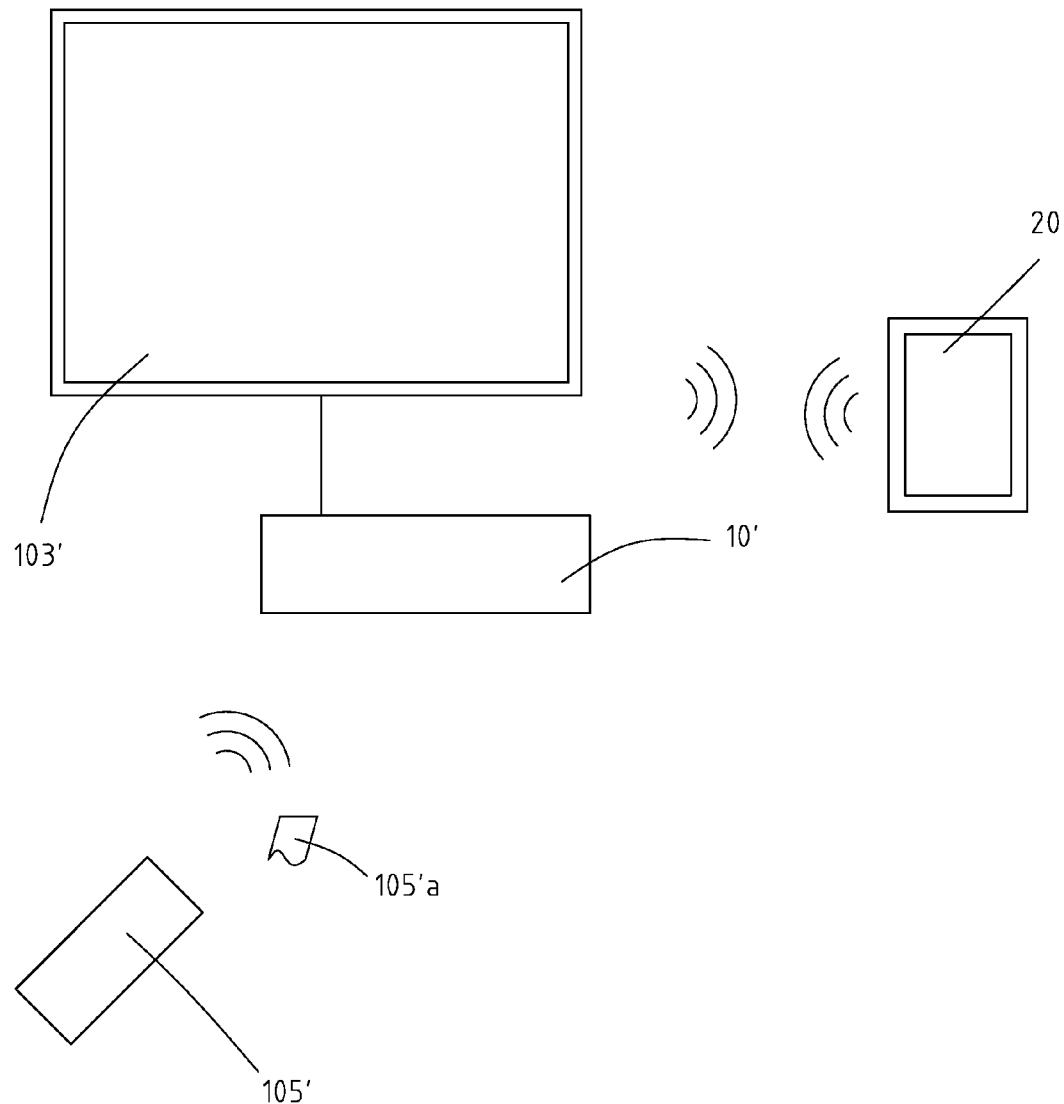
FIG. 10 is a schematic view of the set-top box video playing device capable of external connection to an application processor and wireless connected to the portable carrier according to the second embodiment of the present invention.

Referring to FIGS. 9, 10, there are shown schematic views of the video playing devices 10, 10' provided in the form of set-top boxes and wired or wireless connected to the portable carrier 20, respectively. The screen 103, 103' is externally connected to video connection terminals (such as HDMI connection terminals) of the video playing devices 10, 10'.

In the first and second embodiments, if the video playing devices 10, 10' are capable of being connected to the Internet, the video playing devices 10, 10' can be connected to the Internet via the portable carrier 20. If the portable carrier 20 is provided in the form of a LTE smartphone, the video playing devices 10, 10' (such as TV sets, TV set-top boxes, and game consoles) can be connected to the Internet not necessarily by means of a fixed communication network (fixed-line); instead, the video playing devices 10, 10' can be Wi-Fi connected to the LTE smartphone and thus connected to the Internet through the LTE smartphone.

The video playing device 10, 10' of the present invention is conducive to integration of the hardware silicon intellectual property (IP) chip of the application processor 201 of the portable carrier 20 to enable users of the video playing device 10, 10' to use the remote controller 105, 105' directly in operating the portable carrier 20, thereby not only allowing the video playing devices 10, 10' to function as smart video playing devices in accordance with the App executed by the portable carrier 20, but also allowing the users to operate the video playing devices 10, 10' functioning as smart video playing devices with same the remote controller 105, 105'. The present invention greatly enhances the value of video playing devices and portable carriers and involves an inventive step.

Hence, the present invention meets the three requirements of patentability, namely novelty, non-obviousness, and industrial applicability.

The present invention is disclosed above by preferred embodiments and should not be interpreted as restrictive of the scope of the present invention. Hence, all equivalent variations and modifications made to the aforesaid embodiments according to the specification and claims of the present invention should fall within the scope of the present invention.

What is claimed is:

1. A video playing device capable of external connection to an application processor, the video playing device comprising:
    a remote controller comprising a first button group having a plurality of buttons and a second button group having a plurality of buttons, wherein the first button group is for use in operating the video playing device, and the second button group is for use in operating a portable carrier;
    a processor for processing incoming external video signals and portable carrier video signals from the portable carrier, sending the processed signals to a screen for displaying a frame related to the external video signals and a frame related to the portable carrier video signals, and processing a plurality of remote control signals related to the first and second button groups,
    wherein the processor sends a plurality of signals to the portable carrier according to the remote control signals related to the second button group, wherein a portion of the signals triggers the application processor of the portable carrier to execute a plurality of related applications (App),
    wherein the processor and the portable carrier send to and receive from each other data or instructions associated with the App.

2. The video playing device capable of external connection to an application processor of claim 1, wherein the buttons of the first and second button groups are each a physical button switch or a screen virtual button.

3. The video playing device capable of external connection to an application processor of claim 1, wherein the processor sends, whether in a wired or wireless manner, the signals for triggering the application processor to execute the related App.

4. The video playing device capable of external connection to an application processor of claim 1, wherein the remote controller further comprises a microphone, a speaker, and a wireless voice transceiving circuit, wherein the wireless voice transceiving circuit is connected to the microphone and the speaker.

5. The video playing device capable of external connection to an application processor of claim 1, wherein the second button group further provides a cursor coordinate signal to the portable carrier.

6. The video playing device capable of external connection to an application processor of claim 1, wherein the remote controller further comprises a cursor coordinate input device for providing a cursor coordinate signal to the portable carrier.

7. The video playing device capable of external connection to an application processor of claim 1, wherein the processor and the application processor of the portable carrier send to and receive from each other, whether in a wired or wireless manner, the data or the instructions associated with the App.

8. The video playing device capable of external connection to an application processor of claim 1, wherein the external video signals are one of TV program video signals from a cable television station, TV program video signals from a wireless television station, and TV program video signals from an Internet Protocol Television (IPTV) Website.

9. The video playing device capable of external connection to an application processor of claim 1, wherein the video playing device is one of a TV set, a set-top box, a flat display unit, and a game console.

10. The video playing device capable of external connection to an application processor of claim 9, wherein the screen is built-in with the TV set.

11. The video playing device capable of external connection to an application processor of claim 9, wherein the screen is connected to a video connector of the set-top box.

12. The video playing device capable of external connection to an application processor of claim 9, wherein the screen is built-in with the flat display unit.

13. The video playing device capable of external connection to an application processor of claim 1, wherein the portable carrier video signals are output of the application processor when executing the App.

14. The video playing device capable of external connection to an application processor of claim 1, wherein the portable carrier is one of a smartphone, a tablet computer, and a notebook computer.

15. The video playing device capable of external connection to an application processor of claim 9, wherein one of the set-top box, the flat display unit, and the TV set is connected to the Internet via the portable carrier.

* * * * *